Patented June 10, 1941

2,245,233

UNITED STATES PATENT OFFICE 2,245,233

CELLULOSE DERIVATIVE COMPOSITIONS CONTAINING BUTYL BUTOXYACETATE

Henry B. Smith, Rochester, N. Y., assignor to Eastman Kodak Company, Rochester, N. Y., a corporation of New Jersey No Drawing. Application October 18, 1939, Serial No. 300,036

5 Claims. (Cl. 106—40)

This invention relates to compositions of matter in which cellulose derivatives, such as cellulose ethers, for instance ethyl cellulose, benzyl cellulose, and the like, or cellulose esters, for instance cellulose acetate, cellulose acetate-propionate, cellulose butyrate, and the like are combined or mixed with a compatible plasticizer, with or without a common solvent for both, and with or without other useful addition agents, so that the resulting product will have properties such as will make the composition highly advantageous for use in the plastic and analogous arts, such, for instance, as the manufacture of wrapping sheets or tissue, photographic film, molding compounds and products, artificial silk, varnishes or lacquers, coating compositions, interlayers for laminated glass, and the like.

One object of this invention is to produce compositions of matter which may be made into permanently transparent, strong and flexible sheets or films of desired thinness which are substantially waterproof, are unaffected by ordinary photographic fluids and possess the desired properties of a support for sensitive photographic coatings. Another object of my invention is to produce compositions of matter which are capable of easy and convenient manipulation in the plastic and analogous arts, such as in the manufacture of sheets, films, artificial silk filaments, varnishes, lacquers and the like, and to produce compositions which will not injure, or be injured by, the substances or surfaces with which they are associated during manufacture. Another object of my invention is to produce compositions which can be molded at elevated temperatures and high pressures to produce plastic products having the desirable properties of hardness, toughness and elasticity. Still another object of my invention is to produce interlayers for laminated glass which retain their properties of toughness and elasticity at low temperatures. Other objects will become apparent to those skilled in the art to which this invention pertains.

I have discovered that valuable properties may be induced in and/or contributed to compositions containing cellulose ethers or cellulose esters by adding thereto, as a plasticizing compound, butyl butoxyacetate. The particularly useful properties which it induces in or contributes to cellulose derivative compositions containing it are hereinafter enumerated.

In order that those skilled in this art may better understand my invention I would state, by way of illustration, that for the manufacture of photographic film base or other sheets my new compositions of matter may be compounded as follows: 100 parts of ethyl cellulose having an ethoxyl content of 49.5% is dissolved with stirring at atmospheric temperature in 300 to 500 parts, preferably 400 parts, by weight, of a mixture of toluene and alcohol in the proportion of 2 parts of toluene to 1 part of ethyl alcohol, by weight. To this solution may be added from 5 to 20 parts by weight of butyl butoxyacetate. The cellulose ether solution is cast as a sheet, the solvent evaporated, and the resulting sheet stripped from the casting surface.

Others of the many known volatile solvents for cellulose ethers may be employed in place of a toluene-alcohol mixture. In like manner butyl butoxyacetate may be compounded with other cellulose ethers, such as benzyl cellulose, methyl cellulose, etc. It may also be compounded with cellulose esters, a suitable solvent which will dissolve both the cellulose ester and the butyl butoxyacetate being employed: for example, acetone, or an alkylene chloride with or without the addition of an alcohol. Other substances, such as fire-retardents, evaporation retardents, etc., may be added to the film-forming compositions.

Sheets for use in laminated glass may be made by casting, or may be made without the use of volatile solvent by extrusion. Butyl butoxyacetate is a solvent for cellulose ether, even at room temperature. For instance, from 25 to 75 parts of butyl butoxyacetate and 100 parts of ethyl cellulose may be mixed at room temperature or at a reduced temperature, in a suitable mixer, and the mixture may then be worked on hot rolls, in the manner described in U. S. Patent 2,048,686 of F. R. Conklin, until complete homogenization has taken place. The mass thus produced may then be extruded through an annular die, and the tube so formed slit to form a sheet. A sheet containing 120 parts of butyl butoxyacetate per 100 parts of cellulose acetate-propionate showed excellent tensile strength and stretch at a temperature of 10° F.

Sheets or films produced according to my invention have permanently brilliant transparency and low inflammability, burning no more readily than ordinary newsprint. They are very tough and flexible, and maintain flexibility in a superior fashion. For instance, a film of ethyl cellulose plasticized with 15% (15 parts by weight per 100 parts of ethyl cellulose) had an initial flexibility 50% greater than that of a film of the same cellulose ether containing no plasticizer. The elongation such a film will undergo before being broken by stretching is also increased by about 50% over that of the unplasticized film. Moreover, it maintained excellent flexibility for 226 days in a 65° C. oven, whereas an unplasticized film of the same cellulose ether maintained good flexibility for only 128 days under the same conditions. A film of cellulose acetate-propionate plasticized with 12% of butyl butoxyacetate had an initial flexibility of 44 folds as compared to 17 folds for the unplasticized cellulose ester, and at the end of 163 days in a 65° C. oven, still gave 35 folds before breaking, as compared to 6 folds for the unplasticized ester.

Butyl butoxyacetate may also be advantageously used as a plasticizer in cellulose ether or ester molding compositions. For example, 50 parts of the plasticizer, more or less, depending on the hardness or softness of the plastic desired, may be homogeneously mixed with 100 parts of a cellulose ether, and the mixture converted into a transparent or translucent plastic product by molding at a temperature of 130–140° C. and a pressure of 2,500 to 3,000 pounds per square inch for a period of from 2 to 5 minutes, in a manner well known to those skilled in molding compounds of that nature.

What I claim as my invention and desire to be secured by Letters Patent of the United States is:

1. A composition of matter containing a cellulose derivative selected from the group consisting of cellulose ethers and cellulose organic acid esters, and butyl butoxyacetate as a plasticizer therefor.

2. A composition of matter comprising a cellulose ether and butyl butoxyacetate as a plasticizer therefor.

3. A composition of matter comprising a cellulose organic acid ester and butyl butoxyacetate as a plasticizer therefor.

4. A composition of matter comprising ethyl cellulose and butyl butoxyacetate as a plasticizer therefor.

5. A transparent, flexible sheet comprising 100 parts of ethyl cellulose and, as a plasticizer therefor, about 5 to 75 parts, by weight, of butyl butoxyacetate.

HENRY B. SMITH.